United States Patent
Si Larbi Jouanneau et al.

(10) Patent No.: US 7,622,224 B2
(45) Date of Patent: Nov. 24, 2009

(54) LITHIUM STORAGE CELL PRESENTING BOTH A HIGH ELECTRICAL POTENTIAL AND A HIGH LITHIUM INSERTION CAPACITY

(75) Inventors: Severine Si Larbi Jouanneau, Fontaine (FR); Frederic Le Cras, Notre Dame de L'Osier (FR); Carole Bourbon, Saint Michel de Saint Geoirs (FR); Gilles Gauthier, La Tour du Pin (FR)

(73) Assignee: Commissariat à l'Energie Atomique, Paris (FR)

( * ) Notice: Subject to any disclaimer, the term of this patent is extended or adjusted under 35 U.S.C. 154(b) by 835 days.

(21) Appl. No.: 10/998,985

(22) Filed: Nov. 30, 2004

(65) Prior Publication Data

US 2005/0136331 A1  Jun. 23, 2005

(30) Foreign Application Priority Data

Dec. 18, 2003  (FR) .................................. 03 14865

(51) Int. Cl.
*H01M 4/58* (2006.01)
*H01M 4/62* (2006.01)
*H01M 4/40* (2006.01)

(52) U.S. Cl. .................. 429/231.95; 429/217; 429/219; 429/220; 429/221; 429/223; 429/224; 429/231.5; 429/231.6; 429/231.8; 429/231.9; 429/232

(58) Field of Classification Search ........................ None
See application file for complete search history.

(56) References Cited

U.S. PATENT DOCUMENTS

| 5,482,797 A | * | 1/1996 | Yamada et al. ............... 429/221 |
| 6,085,015 A | * | 7/2000 | Armand et al. ............. 385/140 |
| 2001/0044046 A1 | * | 11/2001 | Bito et al. ................. 429/218.1 |
| 2003/0082454 A1 | * | 5/2003 | Armand et al. ........ 429/231.95 |
| 2004/0005265 A1 | * | 1/2004 | Chiang et al. ............... 423/306 |

OTHER PUBLICATIONS

Database Chemabs, Online, Chemical Abstracts Service, Columbus, Nagornii, et al., "Interactions in the system M20-P205-CoO with M=Li, in Na, K" Article No. XP002290226.
Database Chemabs, Online, Chemical Abstracts Service, Columbus, Nagornii, et al., "Interactions in the system M20-P205-CoO with M=Li, in Na, K" Article No. XP002290227.
S. Poisson, et al., Crystal Structure and Caption Transport Properties of the Layered Monodiphoshates: $Li_9M_3(P_2O_7)_3(PO_4)_2$(M= Al,Ga,Cr,Fe).

* cited by examiner

*Primary Examiner*—Dah-Wei D Yuan
*Assistant Examiner*—Katherine Turner
(74) *Attorney, Agent, or Firm*—Oliff & Berridge, PLC

(57) ABSTRACT

A lithium storage cell comprises at least a first electrode comprising an active material wherein $Li^+$ cations can be inserted, a second electrode and an electrolyte. The active material of the first electrode comprises a linear condensed compound comprising at least two tetrahedra, respectively of $AO_4$ and $A'O_4$ type, bonded by a common oxygen atom. A transition metal ion $M^{2+}$ with a degree of oxidation of +2 selected from the group consisting of $Ni^{2+}$, $Co^{2+}$, $Mn^{2+}$, $Fe^{2+}$ and $Ti^{2+}$ is inserted in the linear condensed compound, and the ratio between the number of $Li^+$ cations able to be inserted in the active material and the number of transition metal ions $M^{2+}$ is strictly greater than 1. A and A' are selected from the group consisting of $P^{5+}$, $Si^{4+}$, $Al^{3+}$, $S^{6+}$, $Ge^{4+}$, $B^{3+}$.

11 Claims, No Drawings

LITHIUM STORAGE CELL PRESENTING BOTH A HIGH ELECTRICAL POTENTIAL AND A HIGH LITHIUM INSERTION CAPACITY

BACKGROUND OF THE INVENTION

The invention relates to a lithium storage cell comprising at least a first electrode comprising an active material wherein $Li^+$ cations can be inserted, a second electrode and an electrolyte.

STATE OF THE ART

Lithium storage cells are tending to replace nickel-cadmium (Ni—Cd) or metallic nickel-hydride (Ni—MH) storage cells as autonomous energy source, in particular in portable equipment. The performances and more particularly the specific energy density of lithium storage cells are in fact higher than those of Ni—Cd and Ni—MH cells.

The positive electrode of lithium storage cells is generally formed by lithium and transition metal oxides such as $LiCoO_2$, $LiNiO_2$ and $LiMn_2O_4$, the negative electrode being in most cases made from carbon. The theoretical and practical capacitances per unit mass of these compounds, for an operating voltage with respect to metal lithium of about 4 Volts, are respectively 275 mAh/g and 140 mAh/g for $LiCoO_2$ and $LiNiO_2$ and 148 mAh/g and 120 mAh/g for $LiMn_2O_4$.

Recently, to increase the insertion potential of the active materials of the positive electrode, it was proposed to replace the lithium and transition metal oxides by materials having an olivine isotype structure, for example $LiMPO_4$ or by materials having a NASICON type structure, for example $Li_xM_2(PO_4)_3$, M being a metal. This type of material in fact presents the advantage of being not only less expensive but also more stable in the charged state and in the presence of the electrolyte than the lithium and transition metal oxides usually used. In addition, materials having an olivine isotype or NASICON type structure are non-toxic.

Thus, the document U.S. Pat. No. 6,391,493 proposes to use ordered olivine structure compounds such as $LiMnPO_4$, $LiCoPO_4$ and $LiNiPO_4$ as active material for the positive electrode of a secondary lithium cell. These compounds have a relatively high lithium intercalation potential. However, problems of structure and stability with respect to the electrolyte when the lithium cell is operating do not enable stable performances to be obtained in the course of different operating cycles. Furthermore, these compounds do not enable more than one electron per $Li^+$ ion to be exchanged by transition metal.

To increase the insertion capacity of active materials of electrode, it has been proposed to use compounds whose structure is derived from lithium orthosilicates or lithium phosphates. Theoretically, this type of compounds can lead, by transition metal, to an exchange of two electrons per $Li^+$ ion, which would ensure a higher insertion capacity than that of the previously mentioned active compounds.

The document U.S. Pat. No. 6,085,015 proposes, for example, to use an orthosilicate the structure whereof is based on an $SiO_4^{4-}$ anion in which at least one transition element with at least two valency states is inserted. The lithium can insert itself in the structure or leave it so as to compensate a change of valency of the transition element during use of the cell. The potentials of the couples of transition metals involved in this type of compounds are close to those of materials with olivine isotype structure or of NASICON type, and oxidation problems of the electrolyte can therefore occur thus reducing the performances of the lithium cell.

OBJECT OF THE INVENTION

The object of the invention is to provide a lithium storage cell presenting both a high electrical potential and a high lithium insertion capacity, while keeping a good structural stability, in particular with respect to the electrolyte.

According to the invention, this object is achieved by the fact that the active material comprises a linear condensed compound comprising at least two tetrahedra, respectively of $AO_4$ and $A'O_4$ type, bonded by a common oxygen atom and wherein an $M^{2+}$ ion of transition metal with a degree of oxidation of +2 is inserted, the ratio between the number of $Li^+$ cations able to be inserted in the active material and the number of transition metal ions $M^{2+}$ being strictly greater than 1, A and A' being selected from the group consisting of $P^{5+}$, $Si^{4+}$, $Al^{3+}$, $S^{6+}$, $Ge^{4+}$, $B^{3+}$ and $M^{2+}$ being selected from the group consisting of $Ni^{2+}$, $Co^{2+}$, $Mn^{2+}$, $Fe^{2+}$ and $Ti^{2+}$.

According to a development of the invention, the active material has the following general formula (I):

$$Li_aX_bMZ_d(A_2O_7)_e(A'O_3)_f \qquad (I)$$

in which:

X represents at least one alkaline metal with a degree of oxidation of +1 selected from the group consisting of $Li^+$, $Na^+$, $K^+$, M represents at least one transition metal with a degree of oxidation of +2 selected from the group consisting of $Ni^{2+}$, $Co^{2+}$, $Mn^{2+}$, $Fe^{2+}$, $Ti^{2+}$, Z represents at least one element selected from the group consisting of the metal ions $Cu^+$, $Ag^+$, $Mg^{2+}$, $Ca^{2+}$, $Sr^{2+}$, $Zn^{2+}$, $V^{2+}$, $Cu^{2+}$, $Al^{3+}$, $Ti^{3+}$, $Cr^{3+}$, $Fe^{3+}$, $Mn^{3+}$, $Ga^{3+}$, $V^{3+}$, $Ge^{4+}$, $Sn^{4+}$, $Mo^{4+}$, $Ti^{4+}$, $V^{4+}$, $V^{5+}$, $Ta^{5+}$, $Nb^{5+}$ and $Mo^{6+}$, the chemical elements O, S, F and Cl and a group of $A''O_4$ type, A'' is a cation selected from the group consisting of $P^{5+}$, $Si^{4+}$, $Al^{3+}$, $S^{6+}$, $Ge^{4+}$, $B^{3+}$, a>1, b and d≧0 and at least e or f>0.

According to another feature of the invention, the active material is in the form of a nano-dispersion of the condensed compound with an electronic conducting additive.

DESCRIPTION OF PARTICULAR EMBODIMENTS

A lithium storage cell comprises at least first and second electrodes, respectively positive and negative, and an electrolyte. In the lithium cell, at least the positive electrode comprises an active material generally called lithium insertion material or lithium intercalation material.

$Li^+$ cations can thus be successively inserted in the active material called lithium insertion material and leave it, when the lithium cell is in operation, during charging and discharging operations. The active material, according to the invention, comprises a linear condensed compound comprising at least two anionic tetrahedra, respectively of $AO_4$ and $A'O_4$ type and bonded by a common corner. Thus, each $AO_4$ and $A'O_4$ entity forms an anionic tetrahedron, each corner whereof is occupied by an $O^{2-}$ ion. An $O^{2-}$ ion is common to the two tetrahedra and A and A' each is placed in the centre of the corresponding tetrahedron. It is also said, for ease of expression, that the two tetrahedra $AO_4$ and $A'O_4$ are bonded by a common oxygen atom.

Said active material also comprises an ion $M^{2+}$ of transition metal with a degree of oxidation of +2, selected from the group consisting of $Ni^{2+}$, $Co^{2+}$, $Mn^{2+}$, $Fe^{2+}$ and $Ti^{2+}$ and inserted in the condensed compound. In addition, A and A' are selected from the group consisting of $P^{5+}$, $Si^{4+}$, $Al^{3+}$, $S^{6+}$, $Ge^{4+}$ and $B^{3+}$ and can be distinct or identical.

Thus, according to the invention, the active material of the positive electrode comprises a linear condensed polyanion wherein a transition metal ion $M^{2+}$ is inserted, an $Li^+$ cation being able to be inserted in the linear condensed polyanion and leave it when the cell is operating. The linear condensed polyanion can, for example, be in the following form: $O_3A\text{-}O\text{-}A'O_3$ or $A_2O_7$ if A and A' are identical. The number of tetrahedra made common by an oxygen atom is however not limited to two. Thus, the linear condensed polyanion can, for example, comprise two tetrahedra of $AO_4$ type bonded by a common oxygen atom, and a tetrahedron of $A'O_4$ type bonded to the adjacent $AO_4$ tetrahedron by a common oxygen atom. In this case, the linear condensed polyanion is in the following form: $O_3A\text{-}O\text{-}AO_2\text{—}O\text{-}A'O_3$ also noted $A_2O_7\text{-}A'O_3$.

The presence of a condensed polyanion in the positive electrode enables the electrical potential of the couples of transition metals involved when extraction and insertion of the $Li^+$ cations takes place to be lowered due to the lesser inductive effect of these groups as compared with the isolated $AO_4$ group. However, the presence of this condensed polyanion can be detrimental to the density of the compound and to the specific insertion capacity of the lithium, i.e. to the number of electrons exchanged per gram of active material.

Thus, to keep a high lithium insertion capacity and therefore good performances of the lithium storage cell, the ratio between the number of $Li^+$ cations able to be inserted in the active material and the number of transition metal ions $M^{2+}$ is, according to the invention, strictly greater than 1, and preferably equal to 2. Moreover, the transition metal implemented in the active material is able to exchange more than one electron, which is accompanied by an exchange of more than one $Li^+$ cation.

Placing ions in common in adjacent tetrahedra and the number of $Li^+$ cations able to be inserted with respect to the number of transition metal ions in the active material enable a lithium cell to be obtained presenting not only an electrical potential suitable for a good stability of the electrolyte but also a high lithium insertion capacity. Thus, the electrical potential in the active material is situated between 3.8 Volts and 5.0 Volts, and preferably between 4.0 Volts and 4.6 Volts, with respect to the potential of the $Li/Li^+$ couple, so as to remain high while preventing problems of stability of the electrolyte.

According to a particular embodiment, the active material of the positive electrode can comprise other elements than the linear condensed compound and the transition metal ion. The active material can for example be represented by the following general formula (I):

$$Li_aX_bMZ_d(A_2O_7)_e(A'O_3)_f \qquad (I)$$

with a>1, b and d≧0 and at least e or f>0.

In the general formula (I), X represents at least one alkaline metal with a degree of oxidation of +1 selected from the group consisting of $Li^+$, $Na^+$, $K^+$ whereas Z represents at least one element selected from the group consisting of the metal ions $Cu^+$, $Ag^+$, $Mg^{2+}$, $Ca^{2+}$, $Sr^{2+}$, $Zn^{2+}$, $V^{2+}$, $Cu^{2+}$, $Al^{3+}$, $Ti^{3+}$, $Cr^{3+}$, $Fe^{3+}$, $Mn^{3+}$, $Ga^{3+}$, $V^{3+}$, $Ge^{4+}$, $Sn^{4+}$, $Mo^{4+}$, $Ti^{4+}$, $V^{4+}$, $V^{5+}$, $Ta^{5+}$, $Nb^{5+}$ and $Mo^{6+}$, the chemical elements O, S, F and Cl and a group of $A''O_4$ type. A'O is a cation selected from the group consisting of $P^{5+}$, $Si^{4+}$, $Al^{3+}$, $S^{6+}$, $Ge^{4+}$, $B^{3+}$. A'' can be identical to A and/or A'. The groups $A_2O_7$ and $A'O_3$ represented in the general formula (I) correspond to linear condensed compounds of at least two tetrahedra.

The active material of the positive electrode of the lithium storage cell can be formed by any type of known means. As an example, the active material can be in the form of a nano-dispersion comprising the condensed compound, an electronic conducting additive and possibly an organic binder. The nano-dispersion dispersion is then deposited on a metal foil acting as current collector. The electronic conducting additive can be carbon. The organic binder, designed to provide a good ionic conduction and good mechanical performances, can for example be formed by a polymer selected from the group consisting of methylmethacrylate-based polymers, acrylonitrile-based polymers, vinylidene fluoride-based polymers, polyethers and polyesters.

The negative electrode of the lithium storage cell can be formed by any type of known material for use in lithium storage cells. It can, for example, be formed by a material forming a source of $Li^+$ cations for the positive electrode, the lithium cell then forming part of the lithium-metal system. The lithium source constituting the negative electrode is, for example, selected from the group consisting of metal lithium, a lithium alloy, a nano-dispersion of a lithium alloy in a lithium oxide, a lithium nitride and transition metal.

In the case of a lithium storage cell forming part of the lithium-ion system, the negative electrode is not formed by a lithium source for the positive electrode but it is formed by a lithium intercalation or insertion material such as carbon in graphite form or a material of spinelle structure containing lithium and titanium. In this case, the lithium element is never in metal form in the lithium cell. The $Li^{30}$ cations then go backwards and forwards between the two lithium insertion materials of the negative and positive electrodes each time the storage cell is charged and discharged. In this case, the material of the second electrode can also be in the form of a nano-dispersion of a lithium insertion material with an electronic conducting additive, for example carbon, and possibly an organic binder. The nano-dispersion is then preferably deposited on a metal foil forming a current collector.

The electrolyte of the lithium storage cell according to the invention is formed by any type of known material. It can for example be formed by a salt comprising at least the $Li^+$ cation. The salt is for example selected from the group consisting of $LiClO_4$, $LiAsF_6$, $LiPF_4$, $LiR_FSO_3$, $LiCH_3SO_3$, $LiN(R_FSO_2)_2$, $LiN(R_FSO_2)_3$. $R_F$ is selected from the group consisting of a fluor atom and a perfluoroalkyl group containing between 1 and 8 carbon atoms. The salt is preferably dissolved in an aprotic polar solvent and can be supported by a separating element arranged between the first and second electrodes, the separating element then being imbibed with electrolyte.

According to a first example, an active material for a positive electrode of a lithium storage cell is achieved by mixing in a planetary mill, in air for twelve hours:

15.95 g of $Na_4P_2O_7$ and 17.48 g of anhydrous $Ni_2P_2O_7$.

The mixture then undergoes heat treatment for 15 minutes at 600° C. in air to obtain a product having the general formula $Na_2NiP_2O_7$. 1 g of the $Na_2NiP_2O_7$ product is then mixed with 1.52 g of LiCl in 80 mL of ethanol and stirred at 70° C. for about 12 hours. The product is then rinsed with ethanol, with water and then with acetone by centrifugation. It is then placed to dry in a drying oven at 60° C. for a few hours so as to obtain an active material having the general formula $Li_{1,3}Na_{0,7}Ni(P_2O_7)$. The capacitance per unit mass of such an active material is 140 mAh/g.

In an alternative embodiment, 1 g of the $Na_2NiP_2O_7$ product, obtained under similar conditions to those described in the first example, is then mixed with 6.08 g of LiCl in pentanol and stirred at 140° C. for 48 hours. The product is then rinsed with ethanol, with water and then with acetone by centrifugation. It is then placed to dry in a drying oven at 60° C. for a few hours so as to obtain an active material having the general formula $Li_2Ni(P_2O_7)$. The capacitance per unit mass of such an active material is 217 mAh/g.

In a second example, an active material for the positive electrode of a lithium storage cell is achieved by mixing in a planetary mill, in air for two hours:

5.32 g of $Na_4P_2O_7$,
17.442 g of $Ni(NO_3)_2$ 6 $H_2O$,
and 5.28 g of $(NH_4)_2HPO_4$.

The mixture then undergoes heat treatment for 16 hours at 700° C. in air so as to obtain a product having the general formula $Na_4Ni_3(P_2O_7)(PO_4)_2$. 1 g of the $Na_4Ni_3(P_2O_7)(PO_4)_2$ product is then mixed with 5.36 g of LiCl in pentanol and stirred at 140° C. for about 48 hours. The product is then rinsed with ethanol, with water and then with acetone by centrifugation. It is then placed to dry in a drying oven at 60° C. for a few hours so as to obtain an active material having the general formula $Li_4Ni_3(P_2O_7)(PO_4)_2$. The capacitance per unit mass of such an active material is 190 mAh/g.

In a third example, an active material for the positive electrode of a lithium storage cell is achieved by mixing in a planetary mill, in air for twelve hours:

7.977 g of $Na_4P_2O_7$,
8.741 g of $Ni(P_2O_7)$,
7.198 g of $NaH_2PO_4$,
and 2.283 g of saccharose.

The mixture then undergoes heat treatment for 15 minutes at 700° C. in argon so as to obtain a product having the general formula $Na_3Ni(P_2O_7)(PO_3)/C$. 1 g of the $Na_3Ni(P_2O_7)(PO_3)/C$ product is then mixed with 6.69 g of LiCl in pentanol and stirred at 140° C. for about 48 hours. The product is then rinsed with ethanol, with water and then with acetone by centrifugation. It is then placed to dry in a drying oven at 60° C. for a few hours so as to obtain an active material having the general formula $Li_3Ni(P_2O_7)(PO_3)/C$. The capacitance per unit mass of such an active material is 160 mAh/g.

In a fourth example, an active material for the positive electrode of a lithium storage cell is achieved by mixing in a planetary mill, in air for forty eight hours:

7.47 g of NiO,
3.388 g of $LiOH.H_2O$,
and 12.016 g of $SiO_2$.

The mixture then undergoes heat treatment for 15 minutes at 600° C. in air so as to obtain a product comprising single-chain tetrahedra of $SiO_4$ type having the general formula $Li_2Ni(SiO_3)_2$. By product comprising single-chain tetrahedra, we understand that the product forms infinite chains of $SiO_4$ type tetrahedra, each tetrahedron comprising two non-shared oxygen atoms and two oxygen atoms respectively common to the other two tetrahedra adjacent in the chain. The ratio between the silicon and oxygen is then 1 to 3 in each tetrahedron. The capacitance per unit mass of such an active material is 240 mAh/g.

Such active materials are thus used to achieve a lithium storage cell.

Thus, according to a particular embodiment of a lithium storage cell classified in the category of lithium-metal batteries, the negative electrode is formed by metal lithium, in the form of a disk with a diameter of 16 mm and a thickness of 130 micrometers deposited on a nickel disk acting as current collector. The positive electrode is then formed by a 14 mm disk taken from a composite film with a thickness of 50 micrometers. The composite film comprises a nano-dispersion arranged on an aluminium current collector with a thickness of 25 micrometers.

The nano-dispersion comprises 80% mass of material of general formula $Li_4Ni_3(P_2O_7)(PO_4)_2$ achieved as described above in the second example, 8% mass of carbon black forming the electronic conducting material and 12% mass of polyvinylidene hexafluoride forming the organic binder. The lithium cell also comprises a separating element imbibed with a $LiPF_6$ salt in solution in propylene carbonate and forming the liquid electrolyte. At 25° C., such a lithium cell enables 4 $Li^+$ ions to be exchanged per $Li_4Ni_3(P_2O_7)(PO_4)_2$ formula unit in the 2.5V-5V potential range as compared with the potential of the $Li/Li^+$ couple.

For a lithium storage cell classified in the category of lithium-ion batteries, the positive electrode is obtained under the same conditions as those described in the particular embodiment of lithium-metal batteries, the active material being the $Li_3Ni(P_2O_7)(PO_3)/C$ material achieved as previously described in the third example. The negative electrode is formed by a composite material comprising a nano-dispersion arranged on an aluminium current collector. The nano-dispersion comprises 80% mass of $Li_4Ti_5O_{12}$ material, 8% mass of carbon black forming the electronic conducting material and 12% mass of polyvinylidene hexafluoride forming the organic binder. The lithium cell also comprises a separating element imbibed with a $LiPF_6$ salt in solution in propylene carbonate and forming the liquid electrolyte. At 25° C., such a lithium cell enables 2 $Li^+$ ions to be exchanged per $Li_3Ni(P_2O_7)(PO_3)/C$ formula unit in the 0.9V-3.5V potential range as compared with the lithium intercalation potential in $Li_4Ti_5O_{12}$, which corresponds to the potential of the $Ti^{IV}/Ti^{III}$ couple.

The invention claimed is:

1. Lithium storage cell comprising at least a first electrode comprising an active material wherein $Li^+$ cations can be inserted, a second electrode and an electrolyte, wherein the active material comprises a linear condensed compound comprising at least two tetrahedra, respectively of $AO_4$ and $A'O_4$ type, bonded by a common oxygen atom and wherein an $M^{2+}$ ion of transition metal with a degree of oxidation of +2 is inserted, the ratio between the number of $Li^+$ cations able to be inserted in the active material and the number of transition metal ions $M^{2+}$ being strictly greater than 1, A and A' being selected from the group consisting of $P^{5+}$, $Si^{4+}$, $Al^{3+}$, $S^{6+}$, $Ge^{4+}$, $B^{3+}$ and $M^{2+}$ being selected from the group consisting of $Ni^{2+}$, $Co^{2+}$, $Mn^{2+}$, $Fe^{2+}$ and $Ti^{2+}$, wherein the active material has the following general formula (I):

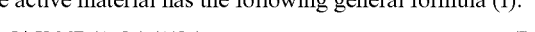

$$Li_aX_bMZ_d(A_2O_7)_e(A'O_3)_f \qquad (I)$$

in which:

X represents at least one alkaline metal with a degree of oxidation of +1 selected from the group consisting of $Li^+$, $Na^+$, $K^+$, M represents at least one transition metal with a degree of oxidation of +2 selected from the group consisting of $Ni^{2+}$, $Co^{2+}$, $Mn^{2+}$, $Fe^{2+}$, $Ti^{2+}$, Z represents at least one element selected from the group consisting of the metal ions $Cu^+$, $Ag^+$, $Mg^{2+}$, $Ca^{2+}$, $Sr^{2+}$, $Zn^{2+}$, $V^{2+}$, $Cu^{2+}$, $Al^{3+}$, $Ti^{3+}$, $Cr^{3+}$, $Fe^{3+}$, $Mn^{3+}$, $Ga^{3+}$, $V^{3+}$, $Ge^{4+}$, $Sn^{4+}$, $Mo^{4+}$, $Ti^{4+}$, $V^{4+}$, $V^{5+}$, $Ta^{5+}$, $Nb^{5+}$ and $Mo^{6+}$, the chemical elements O, S, F and Cl and a group of $A''O_4$ type, A" is a cation selected from the group consisting of $P^{5+}$, $Si^{4+}$, $Al^{3+}$, $S^{6+}$, $Ge^{4+}$, $B^{3+}$, a>1, b and d≧0 and e and f>0.

2. Lithium storage cell according to claim 1, wherein A" is identical to A and/or A'.

3. Lithium storage cell according to claim 1, wherein the active material is in the form of a nano-dispersion of the condensed compound with an electronic conducting additive.

4. Lithium storage cell according to claim 3, wherein the conducting additive is carbon.

5. Lithium storage cell according to claim 3, wherein the nano-dispersion also comprises an organic binder.

6. Lithium storage cell according to claim 5, wherein the organic binder is formed by a polymer selected from the group consisting of methylmethacrylate-based polymers, acrylonitrile-based polymers, vinylidene fluoride-based polymers, polyethers and polyesters.

7. Lithium storage cell according to claim 1, wherein the second electrode comprises at least one material selected from the group consisting of metal lithium, a lithium alloy, a nano-dispersion of a lithium alloy in a lithium oxide, a material of spinelle structure comprising lithium and titanium, a lithium and transition metal nitride, carbon and a lithium intercalation compound.

8. Lithium storage cell according to claim 1, wherein the electrolyte is formed by a salt comprising at least the $Li^+$ cation.

9. Lithium storage cell according to claim 8, wherein the salt is selected from the group consisting of $LiClO_4$, $LiAsF_6$, $LiPF_4$, $LiR_FSO_3$, $LiCH_3SO_3$, $LiN(R_FSO_2)_2$, $LiN(R_FSO_2)_3$, $R_F$ being selected from the group consisting of a fluor atom and a perfluoroalkyl group containing between 1 and 8 carbon atoms.

10. Lithium storage cell according to claim 8, wherein the electrolyte also comprises an aprotic polar solvent in which the salt is dissolved.

11. Lithium storage cell according to claim 10, wherein the storage cell comprises a separating element designed to be arranged between the first and second electrodes and imbibed with electrolyte.

* * * * *